United States Patent [19]

Le Salver et al.

[11] Patent Number: 4,720,086
[45] Date of Patent: Jan. 19, 1988

[54] ELASTICALLY YIELDABLE UNIT IN PARTICULAR FOR THE SUSPENSION OF AN ENGINE OF A VEHICLE

[75] Inventors: Robert Le Salver, Chanteloup les Vignes; Dominique Poupard, Chaville, both of France

[73] Assignees: Automobiles Peugeot; Automobiles Citroen, both of Paris, France

[21] Appl. No.: 597,571

[22] Filed: Apr. 9, 1984

Related U.S. Application Data

[63] Continuation of Ser. No. 403,526, Jul. 30, 1982, abandoned, which is a continuation of Ser. No. 197,609, Oct. 16, 1980, abandoned.

[30] Foreign Application Priority Data

Oct. 22, 1979 [FR] France .................. 79 26137

[51] Int. Cl.⁴ ............................. F16F 9/10
[52] U.S. Cl. .................. 267/140.1; 248/562; 248/634; 280/710; 384/99; 384/215
[58] Field of Search ............ 188/298, 379; 248/562, 248/634, 636, 638; 267/8 R, 35, 113, 140.1, 140.2, 140.3, 140.4, 140.5; 280/760, 762, 697; 384/99

[56] References Cited

U.S. PATENT DOCUMENTS

| | | | |
|---|---|---|---|
| 2,226,388 | 12/1940 | Richter | 267/63 R |
| 2,387,066 | 10/1945 | Harding | 248/358 |
| 2,540,130 | 2/1951 | Lee | 248/358 |
| 3,202,388 | 8/1965 | Goodwin | 248/8 |
| 3,586,403 | 6/1971 | Cooley | 308/187.1 |
| 3,651,902 | 3/1972 | Peddinghaus | 188/269 |
| 3,731,771 | 5/1973 | Borgo | 188/320 X |
| 3,795,390 | 3/1974 | Kendall et al. | 267/35 X |
| 3,958,654 | 5/1976 | Le Salver et al. | 280/708 |
| 3,970,162 | 7/1976 | Le Salver et l. | 280/715 |
| 4,054,277 | 10/1977 | Siruen | 267/35 |
| 4,159,091 | 6/1979 | Le Salver et al. | 248/562 |
| 4,215,842 | 8/1980 | Brenner et al. | 267/113 X |
| 4,262,886 | 4/1981 | Le Salver et al. | 267/140.1 |
| 4,277,056 | 7/1981 | Ticks | 267/140.1 |

FOREIGN PATENT DOCUMENTS

| | | |
|---|---|---|
| 547194 | 2/1934 | Fed. Rep. of Germany ........ 267/35 |
| 728501 | 11/1942 | Fed. Rep. of Germany ........ 267/35 |
| 1625389 | 7/1970 | Fed. Rep. of Germany . |
| 7407909 | 5/1977 | Fed. Rep. of Germany . |
| 926846 | 4/1947 | France . |
| 1242350 | 8/1960 | France .................. 188/320 |
| 1336186 | 7/1963 | France .................. 188/320 |
| 1380784 | 10/1964 | France . |
| 1540380 | 9/1968 | France . |
| 1549300 | 12/1968 | France . |
| 2349066 | 11/1977 | France . |
| 2394715 | 1/1979 | France . |
| 2041485 | 9/1980 | United Kingdom . |

OTHER PUBLICATIONS

Report, "Theory of the Hydraulically Damped Motor Mount with a Long Nozzle".
Report Comparing Motor Mounts.
Drawing dated Oct. 5, 1979 with Attachments.
Freudenberg Drawing 10780 dated Nov. 5, 1979.

*Primary Examiner*—George E. A. Halvosa
*Attorney, Agent, or Firm*—Burns, Doane, Swecker & Mathis

[57] ABSTRACT

The invention provides an elastically yieldable unit which can be manufactured in mass production and ensures a good filtering of vibrations both of high frequency and low amplitude and of low frequency and high amplitude. Such a unit comprises two chambers filled with liquid. These chambers are defined at least partly by elastically yieldable walls and are separated by a rigid partition wall and a movable wall carried by the partition wall. Further, the rigid partition wall defines a conduit of great length and small section which puts the two chambers in communication with each other.

32 Claims, 2 Drawing Figures

ELASTICALLY YIELDABLE UNIT IN PARTICULAR FOR THE SUSPENSION OF AN ENGINE OF A VEHICLE

This is a continuation of U.S. Ser. No. 403,526, filed July 30, 1982, now abandoned, which in turn is a continuation of U.S. Ser. No. 197,609, filed Oct. 16, 1980, now abandoned, which claims foreign priority from French patent application No. 79 26 137, filed Oct. 22, 1979.

DESCRIPTION

The invention relates to an elastically yieldable unit adapted to connect to a rigid support a member or a unit upon which actions of different types are exerted. As an example of an application, these units are more particularly adapted to the suspension of a heat engine relative to the structure of an automobile vehicle.

It is known that the elastically yieldable units employed on an automobile vehicle for suspending the engine have for main purpose to filter the vibrations due to an imperfect balancing of the engine. In this respect, they must have high flexibility. Unfortunately, this high flexibility results in a considerable impairment of the comfort under the effect of low-frequency trembling coming from the road and transmitted to the structure owing to an insufficient absorption.

In order to overcome this drawback, it has already been proposed to provide elastically yieldable units which comprise two chambers filled with liquid and separated by a wall provided with a calibrated orifice and mounted to be free to move between two seats through a predetermined distance in a direction perpendicular to its mean plane.

A unit arranged in this way has a very low stiffness for vibrations of high frequency (>30 Hz) and low amplitude, owing to the movements of the moveable wall. It has an increased stiffness and a good shock absorbing effect for lower frequencies (5 to 15 Hz) and a larger amplitude of the movements (>0.5 mm), owing to the laminating effect of the liquid through the calibrated orifice formed in the movable wall.

Such a unit has however the drawback of being delicate to produce owing to the high precision required in the very small clearance left between the moving wall and the two seats therefor.

Elastically yieldable units are also known which comprise two chambers filled with liquid and interconnected by way of at least one passageway of great length and small section, so that the frequency of resonance of the liquid mass in movement in the passageway or passageways substantially coincides with the frequency of resonance of the engine on its suspension. This provides a unit having a column of liquid producing a very high shock absorption in the zone of frequencies corresponding to the frequency of resonance of the engine on its suspension and a rather good filtering of the vibrations of high frequency and low amplitude. However, this filtering is not as good as with the aforementioned unit having a movable wall.

An object of the invention is to provide an elastically yieldable unit which ensures both a filtering which is as good as the unit having a movable wall for high frequencies and low amplitudes and a shock absorption which is as good as the unit having a column of liquid for low frequencies and high amplitudes, while it is particularly easy to employ in mass production.

According to the invention, there is provided an elastically yieldable unit comprising two chambers filled with liquid and defined at least partly by elastically yieldable walls and separated by a rigid partition wall defining two seats between which seats a movable wall is movable in a direction perpendicular to its mean plane, wherein said rigid partition wall defines a conduit of great length and small section which interconnects the two chambers.

According to another feature of the invention, the rigid partition wall is made from two members which are united in a joint plane which is roughly parallel to and/or coincident with the mean plane of the movable wall and define in their confronting sides complementary grooves each of which grooves is connected to the opposite side of the member through a passageway, said grooves and passageways defining the aforementioned conduit.

One embodiment of the invention will be given in the following description with reference to the accompanying drawing in which.

Figure 1:
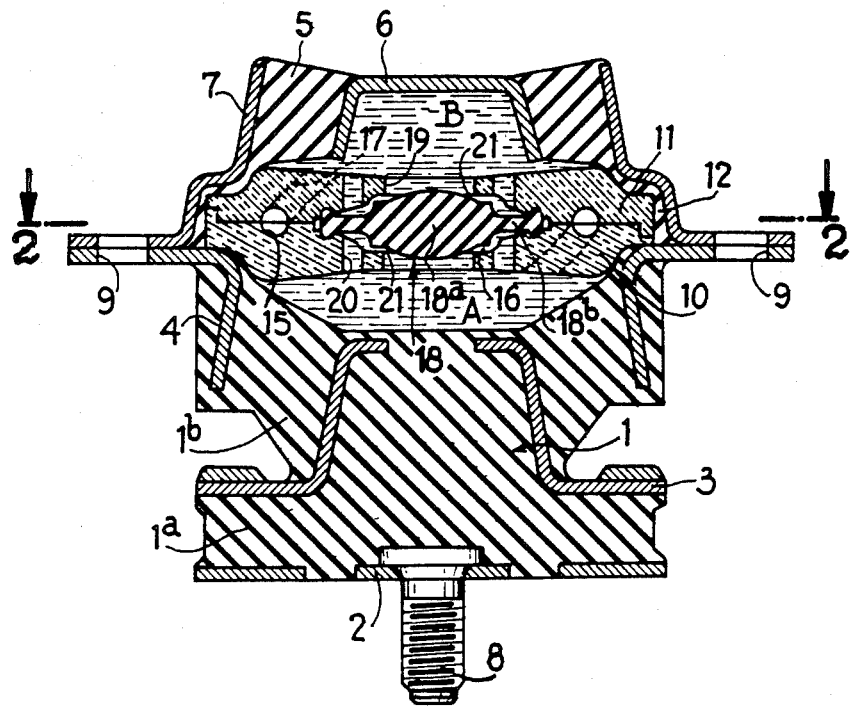
FIG. 1 is an axial sectional view of an elastically yieldable unit.

The elastically yieldable unit shown in FIG. 1 comprises in particular, on one hand, an elastomeric block 1 bonded or vulcanized to three plates 2, 3 and 4 and, on the other hand, an elastomeric block 5 bonded or vulcanized to two plates 6 and 7. The block 1 in fact has two main parts $1^a$, $1^b$ which are disposed respectively between the plates 2, 3 and the plates 3, 4.

The plate 2 is adapted to be fixed to the structure of an automobile vehicle by means of a screw 8 and the plates 4 and 7, which are fixed to each other, for example by a clipping together, are adapted to be connected to the engine (not shown) of the vehicle in the region of fixing orifices 9.

Between the plates 4 and 7, two rigid circular discs 10 and 11 are clamped together on their peripheral portion. A layer of elastomer 12, bonded or vulcanized to the plate 7 at the same time as the block 5, enables the discs 10 and 11 to be well clamped together without requiring any particular dimensional precision.

Figure 2:
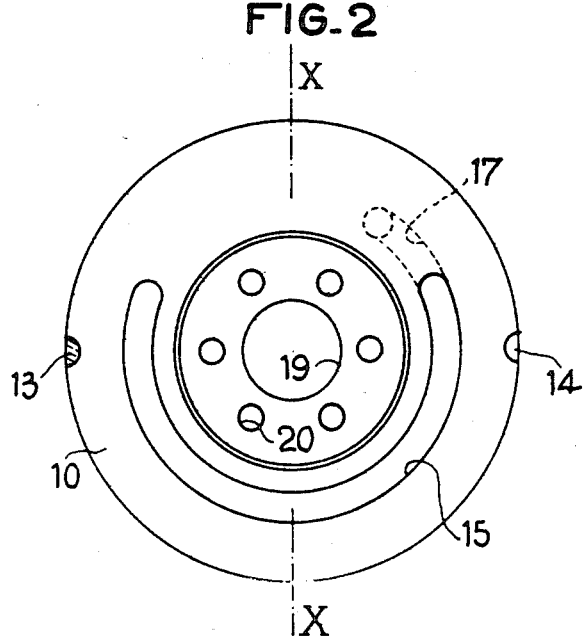
FIG. 2 is a view of a rigid partition wall member along the line 2—2 of FIG. 1.

The two discs 10 and 11 are identical to each other and symmetrically disposed relative to a diameter X—X (FIG. 2), each disc having a projection 13 which cooperates with a cavity 14 of the other disc so as to ensure their correct relative position.

The disc 10 defines with the elastomeric block 1 a first chamber A and the disc 11 defines with the elastomeric block 5 and the plate 6 a second chamber B.

On the sides of the discs 10 and 11 adapted to be applied against each other, and constituting a joint plane, there are formed a groove 15 and a centre cavity 16. Each groove 15 extends on a portion of a circumference which sustends an angle at the centre preferably greater than 180° and this groove is connected without any sudden bend to a passageway 17 which communicates with the opposite side of the corresponding disc. The grooves 15 of the two discs which face each other define with the passageways 17 a conduit of great length and small section, i.e., a closed section not directly communicating with the cavity 16 through which conduit the chambers A and B directly communicate with each other. The contour of the conduit permits giving this conduit a length which is 20 to 50 times greater than its diameter.

Clamped between the discs 10 and 11 in the cavities 16 is a movable wall 18 comprising a centre portion 18$^a$ which is massive and substantially undeformable and a thin peripheral portion 18$^b$ which is more flexible and by means of which the wall 18 is held. This thin peripheral portion permits a displacement of the massive centre portion in a direction perpendicular to its mean plane while it ensures the return of this centre portion to an intermediate position thereof. This mean plane is contained in the joint plane of the two discs 10 and 11.

Also formed in each disc 10 and 11 is a centre orifice 19 of large section, which opens onto the centre of the cavity 16, and orifices 20 of small section which open onto the region of the periphery of the cavity 16. The inner edge of the cavity 16 in the vicinity of the centre orifice 19 constitutes a seat 21 on which is applicable the massive portion of the movable wall 18.

The chambers A and B are filled with liquid by a known process, for example by clipping the plates 4 and 7 together while they are immersed.

The elastically yieldable unit just described operates in the following manner:

In respect of small amplitudes of vibration (±0.1 mm), the movable wall 18 is free to move between its seats 21 by deformation of its flexible peripheral portion. The unit then has a very low stiffness which provides an excellent filtering of high-frequency vibrations produced and transmitted by the engine.

The orifices 20 serve to evacuate the liquid between the movable wall 18 and the discs 10 and 11 so as to avoid opposing the displacements of the movable wall at high frequency.

In respect of large amplitudes (> ±0.3 mm) and low frequency (5 to 15 Hz), the bearing of the movable wall 18 on its seats constrains the liquid to pass through the conduit 15, 17 which produces a large increase in the stiffness and the shock absorption which promote a decrease in the trembling due to the state of the road. The shock absorption is maximum at the frequency at which the mass of liquid contained in the conduits 15, 17 enters into resonance. This value may be considerably higher than that obtained by lamination of the liquid through a calibrated orifice, everything else being equal.

In addition to these advantages, the phenomenon of the amplification of the movements of the liquid in the neighbourhood of the frequency of resonance amplifies the movements of the movable wall so that it is possible to increase the clearance between this wall and the seats therefor for a given value of the amplitude of vibration of the plates beyond which the movable wall bears against the seats. Consequently, wider manufacturing tolerances may be allowed which considerably facilitates mass production.

Consequently, in accordance with the desired objective, such an elastically yieldable unit offers a whole series of advantages which appeared incompatible in prior arrangements and yet is easier to produce.

Having now described our invention what we claim as new and desire to secure by Letters Patent is:

1. In an elastically yieldable unit comprising two chambers filled with a liquid and defined at least partly by elastically yieldable walls, a rigid wall separating the two chambers and defining a cavity, orifice means putting the two chambers in communication with the cavity and two spaced-apart seats; the improvement comprising in combination means for damping vibrations of a given frequency and given amplitude and comprising an unbroken solid movable wall having a mean plane and a peripheral marginal portion and sealingly combined with the rigid wall by said peripheral marginal portion and movable between the two spaced-apart seats in a direction perpendicular to said mean plane for application against either of said seats, and means for damping vibrations of a frequency lower than said given frequency and of an amplitude larger than said given amplitude and comprising conduit means of great length and a closed section which is small relative to said length and defined within and by the rigid wall and puts the two chambers in permanent communication with each other under conditions which are unrelated to the manner in which said movable wall is applied against said seats, said conduit means having a length sufficiently greater than its diameter so that fluid resonance occurs therein to dampen high amplitude vibrations.

2. An elastically yieldable unit as claimed in claim 1, wherein the rigid wall comprises two members which are united on a joint plane which is substantially parallel to said mean plane of the movable wall and define in confronting sides of the members complementary grooves each of which grooves is connected to an opposite side of the corresponding member by a passageway, said grooves and passageways completely defining said conduit means.

3. An elastically yieldable unit as claimed in claim 1, wherein the rigid wall comprises two members which are united on a joint plane which is coincident with said mean plane of the movable wall and define in confronting sides of the members complementary grooves each of which grooves is connected to an opposite side of the corresponding member by a passageway, said grooves and passageways completely defining said conduit means.

4. An elastically yieldable unit as claimed in claims 2 or 3, wherein said cavity is a centre cavity and said orifice means comprise a centre orifice of large section and peripheral orifices of small section.

5. An elastically yieldable unit as claimed in claim 4, wherein the two members constituting the rigid wall are identical to each other and comprise complementary interengaging centering means.

6. An elastically yieldable unit as claimed in claim 4, wherein the movable wall comprises a substantially undeformable massive centre portion and an intermediate portion located between said peripheral marginal portion and said centre portion which intermediate portion is thinner and more flexible than the massive centre portion and allows the massive centre portion to move in a direction perpendicular to said mean plane of the movable wall while it ensures that the massive centre portion returns to an intermediate position of the massive centre portion.

7. An elastically yieldable unit as claimed in claim 6, wherein the peripheral marginal portion of the movable wall is clamped between the two members of the rigid wall.

8. An elastically yieldable unit as claimed in claims 1, 2 or 7, comprising two rigid plates between which plates the rigid wall is clamped, a layer of an elastomer being interposed between said rigid wall and at least one of said plates.

9. An elastically yieldable unit as claimed in claim 1, wherein said conduit means has a substantially circular cross-sectional shape and a length which is substantially 20 to 50 times the diameter of the conduit.

10. In an elastically yieldable unit comprising two chambers filled with a liquid and defined at least partly by elastically yieldable walls, a rigid wall separating the two chambers and defining a cavity, orifice means putting the two chambers in communication with the cavity and two spaced-apart seats, the improvement comprising in combination means for damping vibrations of a given frequency and given amplitude and comprising an unbroken solid movable wall having a mean plane and located in said cavity and movable between the two spaced apart seats in a direction perpendicular to said mean plane for application against either of said seats, and means for damping vibrations of a frequency lower than said given frequency and of an amplitude larger than said given amplitude and comprising conduit means of great length and a closed section which is small relative to said length and defined within and by the rigid wall and puts the two chambers in permanent communication with each other under conditions which are unrelated to the manner in which said movable wall is applied against said seats, said conduit means having a length sufficiently greater than its diameter so that fluid resonance occurs therein to dampen high amplitude vibrations.

11. An elastically yieldable unit as claimed in claim 10, wherein the rigid wall comprises two members which are united substantially in a plane which is substantially parallel to said mean plane of the movable wall and define in confronting sides of the members complementary grooves each of which grooves has an end which communicates with a side of the respective member opposed to said confronting side thereof, said grooves completely defining said conduit means.

12. In an elastically yieldable unit comprising two chambers filled with a liquid and defined at least partly by elastically yieldable walls, a rigid wall separating the two chambers and defining a cavity, orifice means putting the two chambers in communication with the cavity and two spaced-apart seats; the improvement comprising in combination means for damping vibrations of a given frequency and given amplitude and comprising an unbroken solid movable wall having a mean plane and a peripheral marginal portion and sealingly combined with the rigid wall by said peripheral marginal portion and movable between the two spaced-apart seats in a direction perpendicular to said mean plane for application against either of said seats, and means for damping vibrations of a frequency lower than said given frequency and of an amplitude larger than said given amplitude and comprising a conduit means of great length and a closed section which is defined within and by the rigid wall and puts the two chambers in permanent communication with each other under conditions which are unrelated to the manner in which said movable wall is applied against said seats, said section of said conduit means having an area identical to an area of a circular section which has a diameter which is substantially 1/50th to 1/20th of the length of said conduit means, said conduit length being sufficiently greater than its diameter that fluid resonance occurs therein to dampen high amplitude vibrations.

13. A working chamber, expansion chamber hydraulic bearing support which comprises:
an element of elastic material having a bearing base top and a concave bottom in a housing,
a diaphragm centered between two stop plates mated to the inside perimeter of the housing bottom,
an expansible wall means forming the expansion chamber mounted on the bottom of the housing, and
a nozzle rigidly associated with the inside perimeter of the housing bottom or with the stop plates, the nozzle connecting the working and expansion chambers,
the length of the nozzle being substantially greater than the transverse dimension thereof and
the ratio of the volume of the working chamber to the volume of the nozzle being sufficient to accommodate displacements of the element of greater than ±0.3 mm and sufficient to establish a fluid resonance in the nozzle.

14. The working chamber, expansion chamber hydraulic bearing support of claim 13 wherein the diaphragm has a peripheral portion sealed to the stop plates.

15. A working chamber, expansion chamber hydraulic bearing support which comprises:
a conical element of elastic material having a bearing base top and a concave bottom in an annular housing,
a diaphragm centered between two stop plates mated to the inside circumference of the housing bottom,
an expansible wall means forming the expansion chamber mounted on the bottom of the housing, and
a nozzle rigidly associated with the inside circumference of the housing bottom or with the stop plates, the nozzle connecting the working and expansion chambers,
the ratio of the length to diameter of the nozzle being in the range of 20:1 to 50:1 and
the ratio of the volume of the working chamber to the volume of the nozzle being sufficient to accommodate displacements of the conical element of greater than ±0.3 mm and sufficient to establish a fluid resonance in the nozzle.

16. A bearing support according to claim 15 wherein the ratio of length to diameter of the nozzle is 20:1 to 50:1 and the ratio of the volume of the working chamber to the volume of the nozzle is sufficient to accommodate deflections of the conical element and sufficient to establish a fluid resonance in the nozzle.

17. A bearing support according to claims 15 or 16 wherein the diaphragm is a stiff small plate, the stop plates are annular rings joining the bottom of the housing, and the diaphragm connected to the rings by a flexible transition piece.

18. A bearing support according to claim 15 wherein the diaphragm is flexible and the stop plates have the form of a grid connected by a support flange to the housing and the recurring slots forming the grid expose a large surface area of the diaphragm.

19. A bearing support according to claim 15 wherein the stop plates are separate from the housing, are sealed liquidtight against the housing, have central recesses for receiving the diaphragm which are sized to maintain an axial separation of the plates and diaphragm, have slots forming a grid exposing a large area of the diaphragm and have a circumferential bead for clamping the diaphragm.

20. A bearing support according to claim 19 wherein several nozzles are distributed over the circumference of the plates at regular spacings and the discharge openings are oriented in the same direction.

21. A bearing support according to claim 20 wherein the pitch angle of the channel in each plate is small.

22. A bearing support according to claims 15, 16, 18, or 19 wherein the nozzle is formed by a spiral-fashion channel in each stop plate, the discharge openings of which end on both sides of the plates tangentially in the respective chambers.

23. A bearing support according to claims 15 wherein the two stop plates are annular rings immovably joined to the housing bottom.

24. A device for reducing transmitted vibrations comprising:
   first attachment means;
   second attachment means having a portion closed by a first flexible wall;
   a partition wall connected to the second attachment means to prevent fluid leakage around a peripheral edge thereof, having a pair of sides, an internal cavity, orifice means for communicating with the cavity from each side of the wall, and a channel means for providing a passage between the sides independently of the orifice means, the channel means having a length and a closed section which is small relative to the length;
   a moveable wall secured in the cavity so that fluid leakage is prevented between the moveable wall and the partition wall;
   the second attachment means, the partition wall, the first flexible wall, and the moveable wall defining a first chamber;
   a second flexible wall extending between the first attachment means and the second attachment means and being connected to both the first and second attachment means so as to avoid fluid leakage, the second flexible wall, the first attachment means, the second attachment means, the partition wall, and the moveable wall defining a second chamber;
   the first chamber, the second chamber and the channel means being filled with an hydraulic fluid;
   one of the first and second attachment means being connected to a source of vibration, the other of the first and second attachment means being connected to a device to be shielded from vibration; and,
   the moveable wall being operable to isolate the other of the first and second attachment means from vibrations at a first frequency and a first amplitude, the channel means being proportioned so as to be operable to establish a fluid resonance at least within the channel means which damps vibrations at a second frequency that is lower than said first frequency and having a second amplitude which is higher than said first amplitude.

25. The device of claim 24 wherein:
   the partition wall is formed from two plates which are united on a common plane, each plate has a first side at the common plane and a second side remote from the common plane, the first side of each plate has a groove, each plate has a passage connecting the corresponding groove with the second side, the grooves of the two plates are complimentary, and the grooves and passages define the channel means.

26. The device of claim 25 wherein the two plates are identical.

27. The device of claim 26 further including centering means on each plate for interengaging the centering means of the other plate.

28. The device of claim 24 wherein:
   the orifice means of the partition wall includes a central opening having a large section and a plurality of peripheral openings around the central opening.

29. The device of claim 24 wherein:
   the moveable wall includes a substantially undeformable center portion and a peripheral portion which is thinner than the center portion and which allows the center portion to move above and below a mean plane while ensuring that the center portion returns to an intermediate position.

30. The device of claim 29 wherein:
   the partition wall includes a pair of plates and the peripheral portion of the moveable wall is clamped between the pair of plates.

31. The device of claim 24 wherein:
   the first attachment means includes two rigid plates between which the partition wall is clamped and a layer of elastomer is interposed between the partition wall and one of the rigid plates.

32. The device of claim 24 wherein:
   the channel means has a circular cross-sectional shape and a length which is 20 to 50 times the conduit diameter.

* * * * *